United States Patent Office 3,545,206
Patented Dec. 8, 1970

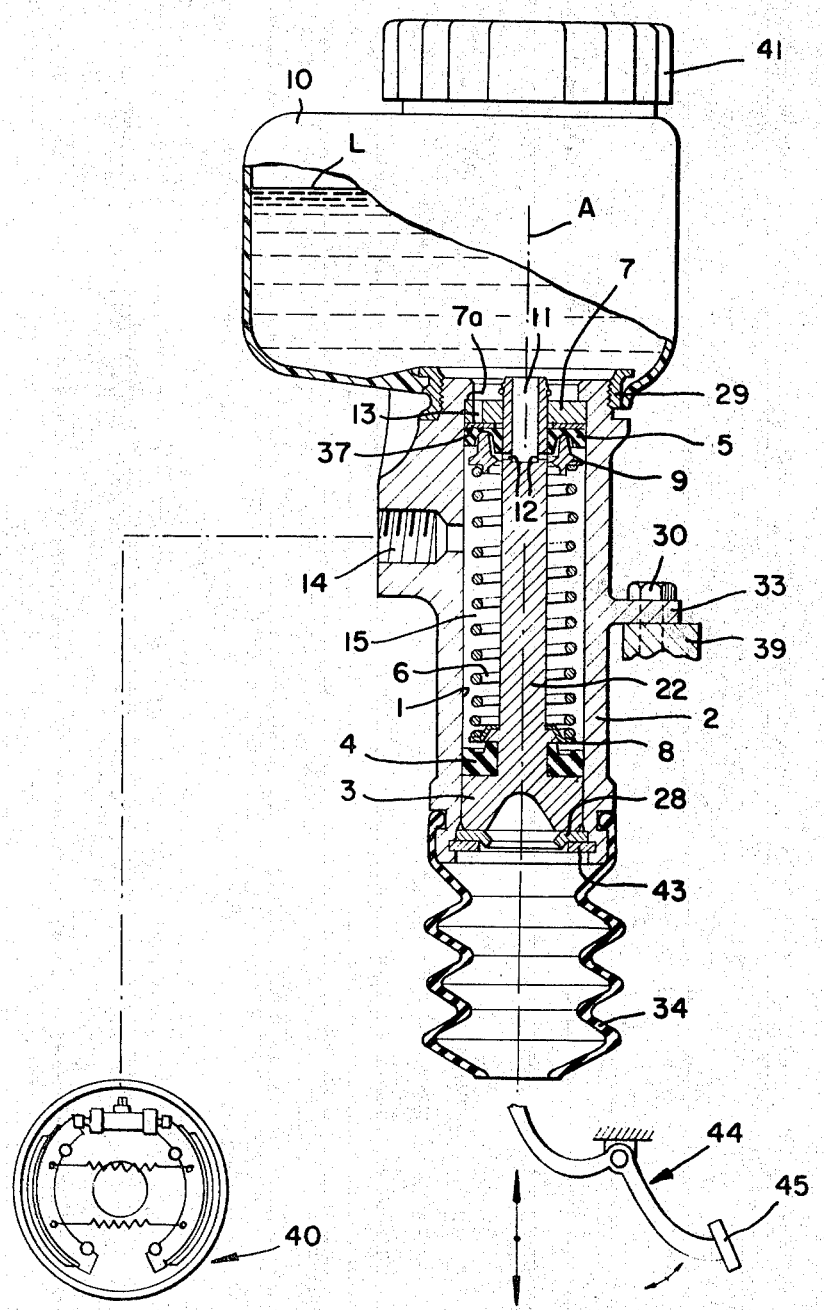

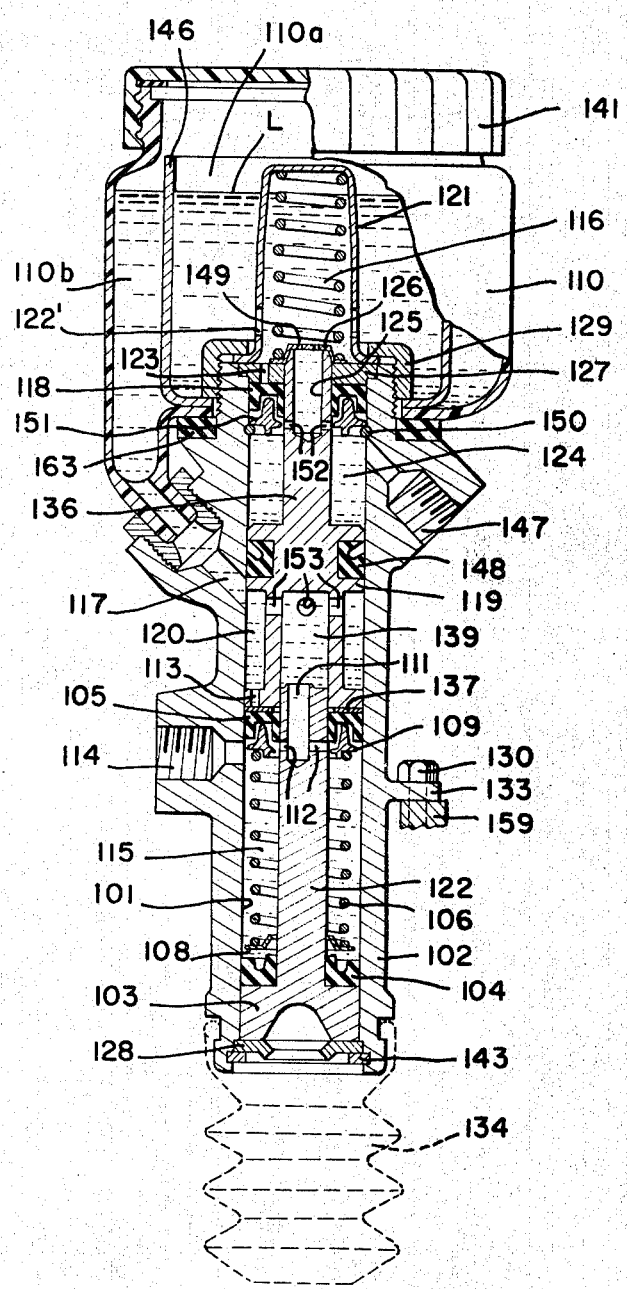

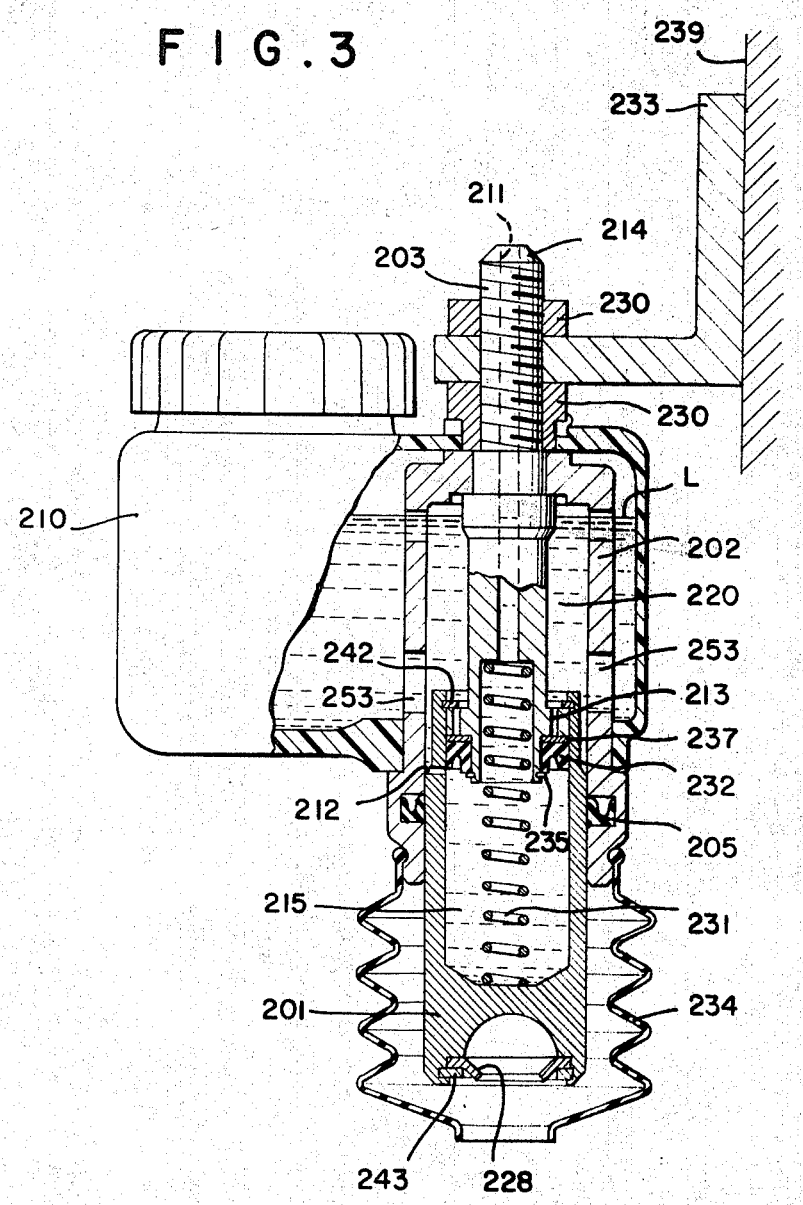

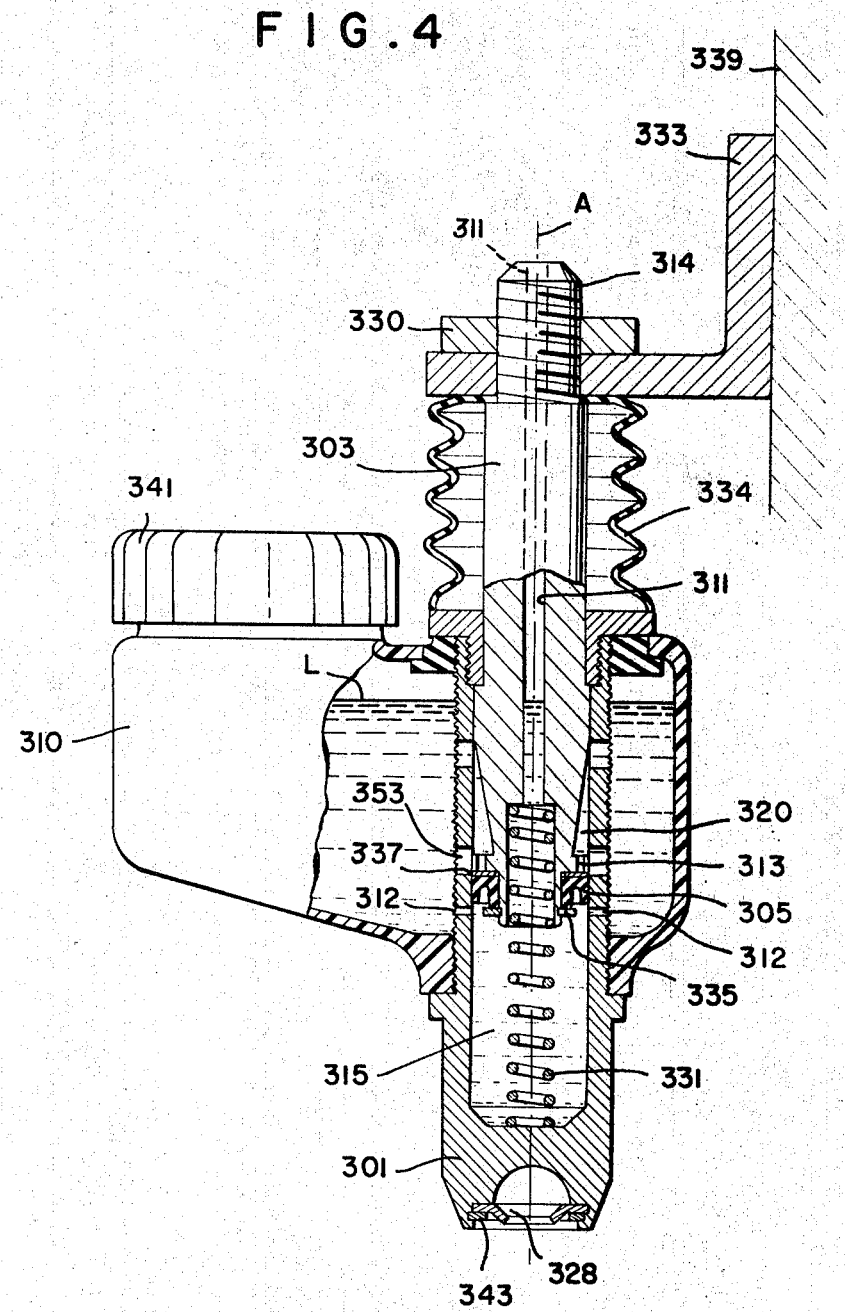

3,545,206
UPRIGHT MASTER CYLINDER FOR VEHICULAR HYDRAULIC-BRAKE INSTALLATION
Juan Belart, Walldorf, Germany, assignor to Alfred Teves GmbH, Frankfurt am Main, Germany, a corporation of Germany
Filed Dec. 16, 1968, Ser. No. 783,981
Claims priority, application Germany, Jan. 23, 1968, T 35,745
Int. Cl. F15b 7/08
U.S. Cl. 60—54.6    11 Claims

ABSTRACT OF THE DISCLOSURE

A compact master cylinder having a cylinder and a piston member one of which is fixed and the other of which is shiftable along an upright axis with respect to the fixed member. The shiftable member is provided with a passage serving as bypass port that allows the pressurizable chamber in the cylinder to communicate at its uppermost end with a brake-fluid reservoir mounted on either the shiftable or fixed member. This passage is blocked on actuation of the brakes to allow pressurization of the chamber.

My invention relates to a master cylinder for use in a hydraulic brake system and to such a master cylinder applicable to a dual-network brake system.

BACKGROUND OF THE INVENTION

Master cylinders have generally been built heretofore with a piston movable along a horizontal axis and a brake-fluid reservoir mounted above the piston and communicating with a cylinder through ports in a common reservoir cylinder wall. Such master cylinders function adequately, but take up a good deal of space. When the master cylinder is intended for a dual-network brake system, the spatial requirements are even greater. This presents a problem, especially in today's compact cars.

In addition, some work has been done with upright master cylinders. These prior-art arrangements do indeed take up less space than their horizontal counterparts, but present added difficulties. With, for example, the conventional provision of a bypass port near the base of the cylinder, separate provision must be made for bleeding air trapped in the upper regions of the cylinder.

OBJECTS OF THE INVENTION

It is, therefore, the principal object of my invention to provide an improved master cylinder of the upright type.

A further object is to provide such a master cylinder which is automatically bled and which is relatively compact.

SUMMARY OF THE INVENTION

I do this by providing a master cylinder with either a shiftable cylinder member or a shiftable piston member, this shiftable member being provided with a passage forming a bypass port that opens directly from the master cylinder working chamber into the break-fluid reservoir in a rest or first (inoperative or unactivated) position of the member. On actuation of the shiftable member the passage is covered and blocked by a gland or seal (e.g. the primary cup of the inner member) to allow pressurizing of the working chamber defined by the piston and cylinder members.

According to a further feature of my invention, the brake-fluid reservoir can be mounted on either the piston or cylinder member, that is, either on the fixed or shiftable member. The reservoir surrounds the upper regions of the master cylinder for optimum compactness and efficiency.

In the case of the shiftable piston, the member is formed with an axial projection which passes through a seal in a bore into the brake-fluid reservoir. This projection further has an axial bore and a tiny radial bore or bores such that the reservoir communicates through them to uppermost portion of the pressurizable chamber with the brake in rest condition. On actuation of the brake, the small radial bore or bores are covered by the seal surrounding the projection as this moves upwardly.

For a dual-network brake system, the master cylinder has a floating or secondary piston with a projection that protrudes into the reservoir as described above. Furthermore, the base of this piston is formed with a further bore accommodating a projection of the primary or mechanically-actuated piston. This primary piston also has the radial and axial bores as described above, and the lower bore in the secondary piston is formed with a further radial bore or bores. An intake compartment is provided between the two pistons; this compartment can communicate with the lower pressurizable chambers through the radial and axial bores of the lower part of the secondary piston and the aligning bores of the primary piston. This intake compartment is connected to an outer compartment of the brake-fluid reservoir (separated by a partition from the inner compartment) which here is advantageously mounted on the top of the cylinder or cylinder member.

In addition the piston can be fixed at its upper end while a cylinder member is shifted upwardly from below. With this embodiment the brake-fluid reservoir can either be mounted on the fixed piston or the shiftable cylinder.

With all such master cylinders the bypass port opens into an extreme upper portion of the pressurizable chamber of the master cylinder so that a constant and automatic bleeding of air in the cylinder is possible.

Thus the present invention provides that one of the two telescoping piston-and-cylinder members be fixed at an upper part of the assembly to a support structure, e.g. the vehicle body or chassis, while the other member is engaged from below by the actuating linkage connected to the brake-pedal of the vehicle. The brake-fluid or reservoir is also located at an upper part of the assembly and communicates via the inlet port with the working chamber therein. The equalization port connecting the reservoir with the chamber is provided in the movable member (to which the linkage is connected) and is blocked upon axial displacement of the movable member relative to the other, stationary, member which sealingly covers this latter port.

BRIEF DESCRIPTION OF THE DRAWING

These and other objects, features, and advantages of my invention will be described in the following, with reference to the drawing in which:

FIG. 1 is an axial section through a master cylinder according to my invention wherein the cylinder is fixed;

FIG. 2 is an axial section through a second embodiment of my invention, the master cylinder here being of the tandem type;

FIG. 3 is an axial section through a third embodiment of a master cylinder according to my invention with a fixed piston and reservoir; and FIG. 4 is an axial section through a fourth embodiment of my invention where the cylinder member and reservoir are shiftable.

SPECIFIC DESCRIPTION

My invention is intended for use in an automotive brake system. Further details of brakes usable with my improved master cylinders can be found in my commonly assigned copending applications Ser. No. 618,058 filed Feb. 23, 1967 and entitled "Disk Brake" (now U.S. Pat. No. 3,442,354) and Ser. No. 655,150 filed July 21, 1967 and entitled "Brake System with Wear-Compensating Means" (now U.S. Pat. No. 3,467,227). Drum brakes as described in p. 855ff of the Mechanical Engineer's Handbook by Theodore Baumeister (McGraw-Hill 1964) are also usable with my invention.

As seen in FIG. 1 a cylinder member or housing 2 is formed with a bore 1 in which a piston 3 can move up and down along a vertical axis A. This housing 2 is held on a support 39 of the chassis of the vehicle by a bolt 30 passing through a flange 33.

A brake-fluid reservoir 10, with a cap 41, has a fluid level L and is mounted atop the housing 2 by means of a ring 29. Below the housing 2 is a brake-actuating device comprising a brake pedal 45 operating a link 44 which transforms the usual forward motion (to the left) of the pedal into an upward vertical displacement of the piston 3. The end of this link 44 is connected through a dust-excluding sleeve or boot 34 to the piston 3.

The piston 3 defines a pressurizable chamber 15 in the bore 1 through which its long rod-shaped cylindrical extension or projection 22 runs, protruding into the reservoir 10 below the level L and guided by a disk 7. The latter rests against a shoulder 7a at the upper end of the bore 1. The lower end of the piston 3 is sealed by a gland 4 (i.e. the primary cup) and the upper end of the projection 22 by a U-section gland 5 resting on a protecting washer 37 on the disk 7 which thus serves as seat for the gland 5. A spring 6 prestressed between the piston 3 and the disk 7, urges the piston 3 down into contact with a piston stop 28 held in place by a retaining ring 43 in an inwardly open groove at the bottom of the bore 1. The spring 6 is seated at the bottom on a spring cup 8 and at the top on a ring 9 pressed into the gland 5, thereby holding the gland 5, washer 37, and disk 7 in place and preventing the flanges of the seal 29 from folding inwardly.

The extension 22 has a passage 11 formed by an axial bore opening into the reservoir 10 and radial equalization bores 12 opening into the working chamber 15 just below the inner flange of the gland 5. The chamber 15 is further connected through a port 14 to a wheel brake 40, for pressurizing it. The disk 7 is formed with an intake port 13.

On actuation of the pedal 45 the piston 3 moves upwardly. After a fractional movement the equalization ports 12 pass the gland 5 and are therefore blocked. Further upward actuation of the piston 3 pressurizes the chamber 15 and, simultaneously, the brake 40 as the glands 4 and 5 prevent any pressure loss into the reservoir 10 or out the bottom of the bore 1.

When the brake pedal 45 is released the spring 6 moves the piston 3 back down and the pressure in the chamber 15 drops lower than that in the reservoir 10. Therefore the gland 5 protected by the washer 37 is deformed slightly—due to the one-way sealing effects of such a gland—and allows fluid to be transferred from the reservoir 10 to the chamber 15 through the bore 13. Once the piston 3 strikes the stop 28, the pressures equalize, the bore 12 being again uncovered, and the master cylinder is ready for further use.

FIG. 2 shows a tandem master cylinder having a cylinder member or housing 102 in which a bore 101 is formed. The bore 101 is subdivided by a primary or mechanically actuatable piston 103 and a secondary or floating piston 119 into two pressurizable chambers 115 and 124 and an intake compartment 120. The housing 102 is mounted on a support 159 on the vehicle body by a bolt 130 passing through a flange 133 on the housing 102. The housing 102 is substantially upright as in FIG. 1.

Atop the cylinder or housing 102 is a reservoir 110 filled to a level L with brake fluid and divided into two compartments 110a and 110b by a cylindrical wall 146.

A cap 141 closes the reservoir 110. The compartment 110b communicates with the intake compartment 120 through a port 117.

The lower piston 103 is actuatable as in FIG. 1 and is sealed below by a gland 104 and above by a gland 105 on its extension 122 also as in FIG. 1. The projection 122 is formed with an axial bore 111 and a radial bore 112. A spring 116 between a ring 109 and a cup 108 biases this piston 103 downwardly against a stop ring 128 held in place by a retaining ring 143. All-in-all, the piston 103 is substantially the same as the piston 3 of FIG. 1. Here one brake network (not shown) of a two-network brake system is connected to a port 114 in the chamber 115 and another network is connected at port 147.

The upper, swimming or floating piston 119 abuts at its lower end on a washer 137 contacting the gland 105 and is formed at this lower end with a small axial bore 113 serving as intake port for the chamber 115 and seat for the washer 137 and gland 105. This lower end portion further has a longitudinal bore 139 telescopically accepting the projection 122 and several radial bores 123 connecting the interior of the bore 139 with the compartment 120. The piston 119 is sealed at its middle by a gland 148 and at its upper end by a gland 118. The upper gland is prevented from dropping on the backstroke of the piston 119 by a ring 151 held by a retaining spring 150. The piston 119 further has an extension 136, analogous to extension 122, and formed with an axial bore 125 and a radial bore 152 as the projection 122. A spring cup 126 perforated at 149 rests atop the projection 136 and is downwardly biased by a spring 116. This spring 116 is braced against a spring cage 121 having holes 122 and held under a retaining nut 129 which also holds the wall 146 in place on a seal 163 and holds a disk 127 perforated at 123 on the bore 101. This disk 127 serves, with the gland 118, as the end wall of the cylinder 102 and as guide for the projection 136.

On actuation of some brake device as shown in FIG. 1 through a dust boot 134 the piston 103 is shifted upwardly in the bore 101. Once the bore 112 passes the gland 105 pressure builds up in the chamber 115 to pressurize brakes through port 114. As soon as the force attributable to the fluid pressure in the chamber 115, less the force of spring 115, is more than force attributable to the pressure of fluid in chamber 124 and the force of the spring 116, the swimming piston 119 is also moved upwardly. This piston 119, once the bore 152 clears the gland 118 pressurizes a second brake network through a port 147. If the spring pressures of springs 115 and 116 are equal and the compression surfaces of both pistons 103 and 119 are also equal, both chambers 115 and 124 will be equally pressurized.

On release of the brakes, the springs 115 and 116 force both pistons 103 and 119 back to their original, illustrated positions. At the same time the piston 119 draws in brake fluid through the bores 122 and 123 and around the gland 118 while the piston 103 draws in brake fluid through the bores 117, 153, 139, and 113 and around the gland 105.

Should a leak develop to drain pressure from the chamber 115, or make it impossible to adequately pressurize it, the extension 122 will simply abut the blind end of the bore 139 and mechanically actuate the piston 119 and also actuate the brake network associated with the chamber 124. In the case of such a leak in the chamber 124, the piston 103 will simply hydraulically force the piston 119 up until the spring 116 can no longer be compressed and therefore the piston 119 is stopped, then will act to pressurize the chamber 115 as normally done. In both cases increased brake-pedal travel will signal the operator that one network has failed, while he will still be able to stop his vehicle.

As long as both springs 115 and 116 have the same force, and the pistons 103 and 119 the same compression surface, both networks will be actuated at substantially the same time to substantially the same extent on shifting the lower piston 103 upwardly. However, should one of the springs 115 and 116 be stronger than the other, its respective piston and brake network will be actuated slightly later than that of other spring 116 or 115, respectively. Varying of the effective surfaces of the pistons 103 and 119 can also affect the pressures in the respective brake networks.

In FIG. 3 one can see a master cylinder in which a piston 203 is the fixed member and a cylinder member 201 is the movable one. The piston 203 is held by nuts 230 onto a bracket 233 fixed to a support 239. The cylinder 201 slides in a chamber 220 defined by a housing 202.

A brake-fluid reservoir 210 is mounted on this housing 202 and held in place by one of the nuts 230. This reservoir 210 has a cap 241 and a fluid level L. The compartment 220 is actually part of the reservoir 210 since it communicates therewith through large holes 253 in its walls 202.

The cylinder member 201 has a socket in its base formed with a ring 228 held by a further ring 243 adapted to secure the end of a linkage from a brake pedal as shown in FIG. 1 led in through an expandable boot 234. This cylinder member 201 is sealed against the piston 203 by a gland 232 supported on a washer 237 overlying holes 213 and held by a snap ring 235 therein. The lower limit of travel of the cylinder 201 is determined by a snap ring 242 set in the walls of this member 201. A spring 231 braced between the floor of the cylinder member 201 and the piston 203 urges the cylinder member 201 downwardly. A gland 205 prevents the reservoir 210 from leaking around the cylinder 201. Just below the gland 232 is a bypass port or passage 212 in the wall of the cylinder member 201.

A connection for a brake (not shown) is connected to nipple 214 which communicates through a bore 211 with the chamber 215 defined by the cylinder 201.

Upward actuation of the cylinder member 201 forces fluid out through the port 212 until this is covered by the gland 232. When this happens the fluid in the pressurizable chamber 215 is pressurized and the brake connected at 214 is also pressurized. On release of the piston 201, the spring 231 urges it down and, when the pressure in chamber 215 is less than that in compartment 220, i.e. in the reservoir 210, fluid is sucked in through the bores 213 around the gland 232 and the washer 237 which serves to protect the gland 232.

Such a master cylinder as shown in FIG. 3 is extremely compact. In addition, as with the other illustrated embodiments, the very upper limit of the chamber 215 communicates with the reservoir 210. In this way any air finding its way into this chamber 215 is automatically bled off into the ventilated reservoir 210.

FIG. 4 shows a master cylinder in which, as in FIG. 3, a piston member 303 is mounted fixed while a cylinder member 301 is shiftable with respect to it along a vertical axis A.

The piston member 303 is held on a bracket 333 on a support 339 by a nut 330. This piston 303 has a longitudinal bore 311 which terminates at one end in a nipple 314 adapted to be connected to a line for a brake (not shown), and at the other end in a pressurizable chamber 315 defined by the piston and cylinder members 303, 301. A boot 334 protects the shaft of this piston 303.

A brake-fluid reservoir 310 with a cap 341 and a fluid level L surrounds the cylinder member 301 and is shiftable with it. It communicates with a compartment 320 through several holes 353 and communicates with the chamber 315 in one illustrated position through passages or bypass ports 312. The piston 303 is fitted with a gland 305 held in place on a washer 337 by a snap ring 335. Above this washer 337 which protects the gland 305 are several intake ports 313.

A spring 331 biases the piston downward and two rings 328 and 343 are adapted to receive a brake linkage as shown in FIG. 1. The boot 334 and the reservoir 310 are clamped in place on the cylinder member 301 by a clamp ring 329 via a seal 354.

Once the passages 312 pass the gland 305 on upward shifting of the cylinder member 301, fluid in the chamber 315 is pressurized and the brake connected at 314 is actuated. On release of the cylinder member 301 it is urged down by the spring 331 thereby refilling, if necessary, by sucking fluid from the reservoir 310 in through the bores 353, the bores 313 and around the gland 305.

Once again, this FIG. 4 embodiment is extremely compact, like the others, and ensures a constant and sure bleeding of the master cylinder on every actuation of the brakes.

I claim:

1. A master cylinder for a hydraulic brake system, said master cylinder comprising:
    a cylinder member having an upright axial bore;
    a piston member in said bore defining a pressurizable chamber therein, said members being relatively displaceable between a first and a second position wherein the volume of said chamber is relatively larger and smaller respectively;
    support means for fixing one of said members;
    actuating means for axially shifting the other of said members with respect to said one of said members; and
    a brake fluid reservoir surrounding said cylinder member over at least part thereof traversed by said piston member and mounted on one of said members, the axially shiftable member being formed with a passage opening at one end into said reservoir below a fluid level therein and communicating at its other end with said chamber only in said first position, thereby permitting fluid transfer between said reservoir and said chamber, said passage being blocked on movement of said axially shiftable member into said second position.

2. The master cylinder defined in claim 1 wherein said shiftable member is said cylinder member and said reservoir is mounted on said piston member.

3. The master cylinder defined in claim 1 wherein said shiftable member is said cylinder member and said reservoir is mounted thereon.

4. The master cylinder defined in claim 1 wherein said members have a common axis, said axis being vertical.

5. The master cylinder defined in claim 1 wherein said other end of said passage opens into an extreme upper portion of said chamber in said first position.

6. The master cylinder defined in claim 1 wherein said actuating means comprises a driver-operated brake device.

7. A master cylinder for a hydraulic brake system, said master cylinder comprising:
    a cylinder member having an upright axial bore;
    a piston member in said bore defining a pressurizable chamber therein, said members being relatively displaceable between a first and a second position wherein the volume of said chamber is relatively larger and smaller respectively;
    support means for fixing said piston member;
    actuating means for axially shifting the cylinder member with respect to said piston member; and
    a brake-fluid reservoir mounted on said cylinder member, said cylinder member being formed with a passage opening at one end into said reservoir below a fluid level therein and communicating at its other end with said chamber only in said first position, thereby permitting fluid transfer between said reservoir and said chamber, said passage being blocked on movement of said cylinder member into said second position.

8. The master cylinder defined in claim 7 wherein said reservoir surrounds said cylinder member over at least a portion thereof traversed by a part of said piston member.

9. A master cylinder for a hydraulic brake system, said master cylinder comprising:
a cylinder member having an upright axial bore;
a piston member in said bore defining a pressurizable chamber therein, said members being relatively displaceable between a first and a second position wherein the volume of said chamber is relatively larger and smaller respectively;
support means for fixing said piston member;
actuating means for axially shifting the cylinder member with respect to said piston; and
a brake-fluid reservoir mounted on said piston member, said cylinder member being formed with a passage opening at one end into said reservoir below a fluid level therein and communicating at its other end with said chamber only in said first position, thereby permitting fluid transfer between said reservoir and said chamber, said passage being blocked on movement of said cylinder member into said second position.

10. The master cylinder defined in claim 9 wherein said reservoir surrounds said cylinder member over at least a portion thereof traversed by a part of said piston member.

11. A master cylinder for a hydraulic brake system, said master cylinder comprising:
a cylinder member having an upright axial bore;
a piston member in said bore defining a pressurizable chamber therein, said members being relatively displaceable between a first and a second position wherein the volume of said chamber is relatively larger and smaller respectively;
support means for fixing said cylinder member;
actuating means for axially shifting the piston member with respect to said cylinder member; and
a brake-fluid reservoir mounted on one of said members, said piston member being formed with a passage opening at one end into said reservoir below a fluid level therein and communicating at its other end with said chamber only in said first position, thereby permitting fluid transfer between said reservoir and said chamber, said passage being blocked on movement of said axially shiftable member into said second position, said piston member being formed with said passage and including a pair of said pistons defining a pair of such pressurizable chambers in said bore, said pistons being substantially coaxial, said reservoir being formed with two substantially independent fluid-containing compartments, each of said compartments being associated with a respective one of said chambers.

References Cited

UNITED STATES PATENTS

| | | | |
|---|---|---|---|
| 2,473,803 | 6/1949 | La Brie | 60—54.6 |
| 2,477,758 | 8/1949 | Majneri | 60—54.6 |

FOREIGN PATENTS

| | | | |
|---|---|---|---|
| 878,380 | 10/1942 | France | 60—54.6 |
| 994,161 | 8/1951 | France | 60—54.6 |
| 885,518 | 8/1953 | Germany | 60—54.6 |

MARTIN P. SCHWADRON, Primary Examiner

R. BUNEVICH, Assistant Examiner